(12) United States Patent
Viamonte Solé

(10) Patent No.: US 9,143,574 B2
(45) Date of Patent: Sep. 22, 2015

(54) PRESENCE SYSTEM AND A METHOD FOR PROVIDING A PRESENCE SERVICE

(75) Inventor: David Viamonte Solé, Barcelona (ES)

(73) Assignee: ESI MOBILE SOLUTIONS SLL, Barcelona (ES)

( * ) Notice: Subject to any disclaimer, the term of this patent is extended or adjusted under 35 U.S.C. 154(b) by 1700 days.

(21) Appl. No.: 12/144,201

(22) Filed: Jun. 23, 2008

(65) Prior Publication Data

US 2009/0319655 A1  Dec. 24, 2009

(51) Int. Cl.
*G06F 15/173* (2006.01)
*H04L 29/08* (2006.01)
*H04L 29/06* (2006.01)

(52) U.S. Cl.
CPC ............ *H04L 67/24* (2013.01); *H04L 65/1006* (2013.01)

(58) Field of Classification Search
USPC ................................................. 709/223–226
See application file for complete search history.

(56) References Cited

U.S. PATENT DOCUMENTS

| 2002/0131395 | A1* | 9/2002 | Wang ............................ 370/349 |
| 2004/0133641 | A1* | 7/2004 | McKinnon et al. ........... 709/204 |
| 2005/0228895 | A1* | 10/2005 | Karunamurthy et al. ..... 709/229 |
| 2007/0033278 | A1 | 2/2007 | Kelley et al. |

FOREIGN PATENT DOCUMENTS

EP   1 441 486 A2   7/2004

* cited by examiner

*Primary Examiner* — Evans Desrosiers
(74) *Attorney, Agent, or Firm* — RatnerPrestia

(57) ABSTRACT

A presence system and method are disclosed. The system comprises, intercommunicated: presentities E1, E2, E3 that provide presence notifications N1, N2, N3; a watcher W able to observe, when received, the presence notifications N1, N2, N3; and a presence service PS that receives the presence notifications N1, N2, N3 and delivers it to the watcher W, which is subscribed to the presence service PS. The presence service PS is able to acquire information about an idle, on-hold or suspended state of the presence subscription of the watcher W, and automatically delivers the presence notifications N1, N2, N3 to the watcher W only when he is not in the idle, on-hold or suspended state. The method is applied to carry out the necessary actions for operating the system proposed.

14 Claims, 1 Drawing Sheet

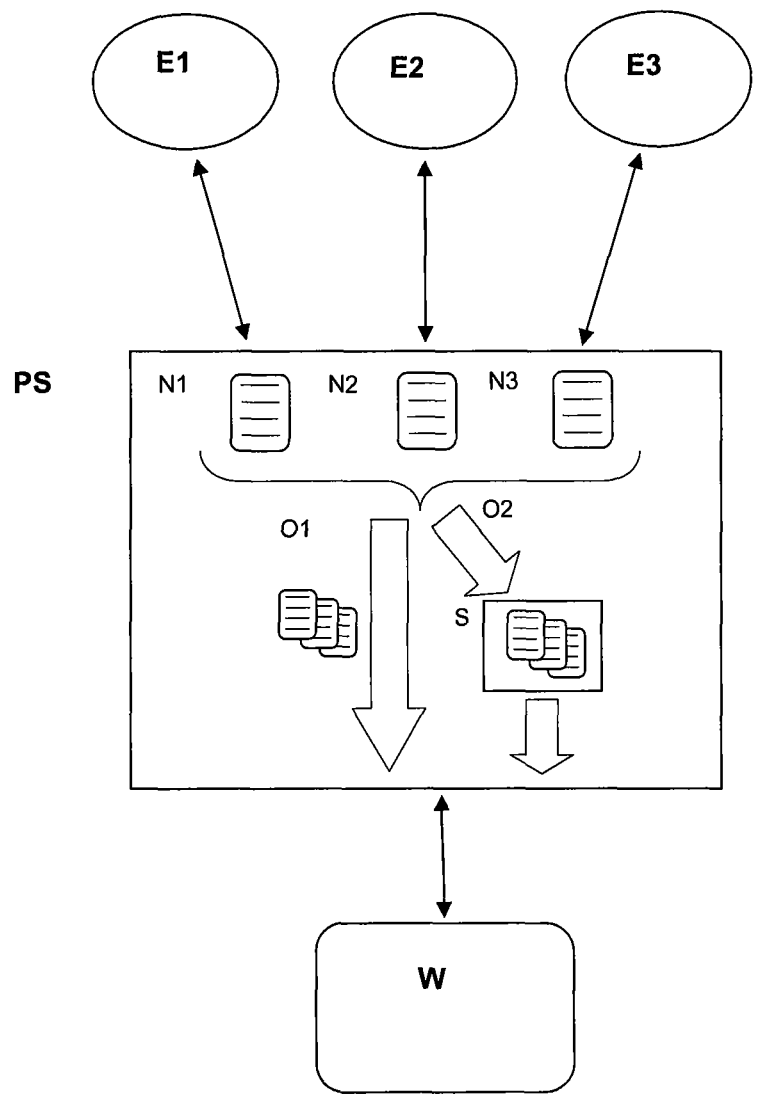

PRESENCE SYSTEM AND A METHOD FOR PROVIDING A PRESENCE SERVICE

TECHNICAL FIELD

The present invention relates to a presence system and a method for providing a presence service, and particularly to a presence system and a method intended for reducing the presence information traffic amount sent to a watcher subscribed to the system, by retaining said information when it is known that said watcher is not prepared to watch it.

BACKGROUND OF THE INVENTION

Presence systems generally relate to systems where a subscriber, usually called a watcher, accesses in order to receive information or notifications about at least presence of other users, called presentities or contacts, from a presence service in charge of managing and updating said information.

Session Initiation Protocol for Instant Messaging and Presence Leveraging Extensions (SIMPLE) Presence is one of said presence systems, and is based in users subscribed to a presentities list through only one Session Initiation Protocol (SIP) SUBSCRIBE message sent to a Resource List Server (RLS) which stores and updates said presentities list, or users subscribed to individual Presentities through a set of SIP SUBSCRIBE messages sent to a Presence Server (PS).

Sometimes a watcher is not prepared to watch said information and/or does not want to be bothered by constantly receiving updated presence information.

There are several proposals regarding the optimization of the presence notification receptions.

One of said proposals is described in the Internet Draft, here cited as "work in progress", "Problem Statement for SIP/SIMPLE" by A. Houri from IBM, T. Rang from Microsoft Corporation, E. Aoki from AOL LLC, V. Singh, H. Schulzrinne from Columbia U., Feb. 26, 2007, (accessible at http://www.softfront.co.jp/tech/ietfdoc/org/draft-ietf-simple-interdomain-scaling-analysis-00.txt).

In said draft it is suggested to optimize the reception of presence notification. In section 7.4 it is described that watchers need not be notified about every presence update of all the contacts at all times. For some contacts watchers may only want to know their presence information when they want to start a communication session. It is proposed to label this as on-demand presence and to accomplish it by using fetch based SUBSCRIBE with expiration interval set to zero. Said approach requires a mechanism in the watcher application to enable watchers to indicate that they only require presence information when starting a new session. Examples may include services, where contacts presence status does not have to be seen or known to a watcher all of the time. It is given as an example a cell-phone associated watcher who may need presence updates only when the cell-phone application (e.g., phone book) runs in the foreground on the device. In section 7.6 other kind of optimizations are described, based on using different kinds of filters applied to presence documents, limited intervals updatings, partial notifications including only what was changed in the presence document from the last sending, and suppressing the sending of unnecessary notifies when for example a subscription is refreshed. In section 7.3 it is described to use a "time presence" status in order to receive only availability information of certain presentities rather than getting notification for every status change of the presentity.

Another of said proposals is described in the Internet Draft, here also cited as "work in progress", "Composing Presence Information" by H. Schulzrinne and R. Shacham from Columbia University, W. Kellerer, S. Thakolsri from DoCoMo Eurolabs, Dec. 27, 2006, (accessible at http://www.potaroo.net/ieff/idref/draft-schulzrinne-simple-composition/).

In section 5 of said draft it is described to provide information to the watcher indicating communication capability of the presentities, according to different "busy status" generally indicated by the user o automatically, including for example when said presentity is "in a car", "on-the-phone", "in a place that does not allow for private communications", or complex rules derived that involve outside information such as time of day, such as for example, when user-input is "idle" between certain hours of the night, the user's activity should be set to "sleeping".

Still another of said proposals is found in the Internet Draft, here also cited as "work in progress", SIMPLE made Simple: An Overview of the IETF Specifications for Instant Messaging and Presence using the Session Initiation Protocol (SIP)" by J. Rosenberg from Cisco, Jun. 23, 2007, (accessible at http://ietfreport.isoc.org/idref/draft-rosenberg-simple-simple/).

Section 2.5 of said draft relates to optimizations regarding presence notifications sent to the watcher. It proposes to use a mechanism that allows a watcher to include filters in its subscription, which limit the cases in which notifications are sent.

EP1441486A2 describes a presence system and a presence notification destination controlling method, used to send presence notifications only to specific subscribers, as a function of, for example, notification destination determination rules including notification conditions designated by subscribers, or according to the attributes of the subscribers. Different examples of rules based on said subscribers attributes are given in the description, such as: "Notify the first subscriber to perform a subscription", "Notify subscribers belonging to a specified group" and "Notify subscribers belonging to the private group if the presence for the presentity is "Free"".

US2007033278 concerns to a method and apparatus for providing a list-based service. It proposes to provide a notification when the list members state satisfy some conditions, such as that the presence state has or has not changed during a time interval, or that it has or has not changed a threshold amount, etc. These conditions can be indicated by the watcher by an indication comprised at the subscription. In said document is not described to apply said conditions to the watcher.

It is not known in the cited prior art, to optimize the presence notification receptions according to states of the watcher different from an active, terminated or pending state, i.e. to stop sending presence notifications to the watcher while he is in an idle on-hold or suspended state, but has not terminated its presence service subscription.

DESCRIPTION OF THE INVENTION

It appears necessary to provide an alternative to the prior art, which can better optimize presence notifications traffic sent to a watcher, by retaining them while it is known that said watcher is not paying attention to said notifications.

In order to achieve that goal, the present invention provides, in a first aspect, a presence system, comprising:
  presence entities, known as presentities, that provide information indicating at least the state of own entity regarding at least presence;

at least one subscriber or watcher able to observe, when received, said information regarding at least presence about one or more of said presentities; and and a presence service that receives said information regarding at least presence from said presentities, such as presence notifications, and delivers it to said watcher which is subscribed to said presence service.

Said presence service is able to acquire information about status of said watcher, i.e. about active, terminated and, in some cases, pending states, and, differently from the prior art proposals, comprises means for acquiring information about at least an idle, on-hold or suspended state of the presence subscription of said at least one watcher, and means for automatically delivering said information regarding at least presence about said presentities to said at least one watcher only when said subscriber is not in said idle, on-hold or suspended state.

For a preferred embodiment, said information regarding at least presence, generally presence notifications, are retained by said presence service while the watcher is in said idle, on-hold or suspended state, and when he returns to an active state of his subscription to the presence service, a kind of resume action is carried out, where only new and pending notifications are sent to the watcher.

In other words, said presence service is adapted to retain said information about said presentities while said watcher is in said idle, on-hold or suspended state, and to deliver said retained, and still up-to-date, information to the watcher upon changing from said idle, on-hold or suspended state to an active state.

The cancellation of the presence notifications sendings according to the system proposed by the present invention is temporary, and thus far from being so drastic as it would be if the watcher subscription state changes from an active to a terminated state, in which case the watcher would need to subscribe back again to the presence service, which could involve an unbearable endless subscription activating-terminating process if the watcher is in low activity periods very often, in which periods he does not want or need to receive presence notifications. That endless process is overcome by the system proposed by the present invention by means of said presence notifications sending temporary cancellations.

As for the herein so-called watcher subscription idle, on-hold or suspended state, this state is a new one defined beyond existing presence subscription states, which (the existing states) for an embodiment where the proposed presence system relates to SIP/SIMPLE Presence are already defined in the SIP/SIMPLE protocol (A. B. Roach, RFC 3265: "Session Initiation Protocol (SIP)-Specific Event Notification", June 2002).

For an embodiment said information acquiring presence service is able to acquire said idle, on-hold or suspended state from a specific content body setting the idle, on-hold or suspended state, and created according to the SIP PUBLISH method (Ali Niemi, RFC 3903, "Session Initiation Protocol (SIP) Extension for Event State Publication", October 2004), or by using any other mechanism to set the subscription state into idle.

For an embodiment said watcher is intended for changing its presence subscription from an active state to said idle, on-hold or suspended state, being said presence service information acquiring means able to acquire said idle, on-hold or suspended state information by an explicit signal received from said watcher, such as an explicit request sent from the watcher to the presence service to carry out said change of its presence subscription from said active state to said idle, on-hold or suspended state.

For an alternative embodiment the presence service information acquiring means are intended for acquiring said idle, on-hold or suspended state information by receiving or determining an implicit signal, for example by means of said presence service and according to known information about the watcher from which the presence service infers that the watcher does not need to receive presence notifications, being in this case said idle state a kind of "virtual" state, result from said inference, while the "official" state of the watcher subscription is still active.

According to different embodiments whether said watcher or said presence service are intended for changing the watcher presence subscription from the idle, on-hold or suspended state to an active state or to a terminated state, by explicit or by implicit means, comprising said explicit means, for example, a message sent by the watcher and received by the presence service information acquiring means to trigger said state transition, and comprising said implicit means, for example, a determination of said state transition carried out by the presence service according to known information about the watcher.

The presence service acquiring means are adapted for acquiring the watcher idle, on-hold or suspended subscription state information by receiving a corresponding message from the watcher, or from any other entity, indicating that the subscription should be placed in the idle, on-hold or suspended status, said message being retrieved by the presence service acquiring means by poll (i.e.: the presence service queries an external entity, including but not limited to watcher's end user device) or push (i.e.: an external entity, including but not limited to watcher's end user device, proactively informs the presence service of such state) means, in a periodic or asynchronous way.

The presence system proposed by the first aspect of the invention comprises, for an embodiment, a server provided with said presence service and a user terminal provided with a presence service client used by said watcher to communicate, through a communication network, with said server to subscribe to the presence service, explicitly communicate transition states if necessary, and to receive and observe said presentities information.

Said presentities comprise presentities terminals with respective presentities clients used to communicate with said server through a communication network to provide to the server with said information indicating at least the state of own entity regarding at least presence.

For different embodiments said idle, on-hold or suspended subscription state refers to a state where watcher's user equipment or terminal is in one or more of following situations, or a combination thereof:
said user terminal is off, and/or
said user terminal is closed if it is a clamshell cellular or wireless terminal, but it is not switched off, and/or
a screensaver is running in foreground, and/or
said user terminal is in a keylock state, and/or
said user terminal is attending a telephone call, and/or
said service client is in a low activity period, and/or
said user terminal is in a known idle, on-hold, battery saving mode or similar state, and/or
said presence service client is not currently displayed to the user, whether because is not running on the user terminal or running in background, or for any other reason, and/or
user is known not to be actively watching at the device screen or display equipment, and/or other similar states, which have in common the fact that reception of timely presence information about one or more presentities is not relevant for the end user at that moment.

Said user terminal and said presentities terminals are usually information processing equipment, being said user terminal generally a personal computer or a cellular, wireless, fixed terminal or device with input/output equipment that includes at least a keyboard, a display, a communication module and a computer-readable recording medium.

For an embodiment the presence service included in the presence system proposed by the first aspect of the invention, is or has the capabilities of a Resource List Server, RLS, with a presentities list registered therein including said information regarding at least presence about said presentities, and wherein the watcher is subscribed to said presence service regarding said presentities list by sending only one SIP SUBSCRIBE message to said RLS.

The presence system proposed generally comprises a plurality of subscribers identical or analogous to said at least one subscriber, or watcher, and in said presence service comprises means for acquiring information about at least an idle, on-hold or suspended state of said plurality of subscribers, and means for delivering said presentities information only to the subscribers of said plurality of subscribers who are not in said idle, on-hold or suspended state, but are in active state, according to the description made regarding said at least one watcher.

A second aspect of the present invention concerns to a method for providing a presence service comprising:
 receiving a subscription, from at least one subscriber, or watcher, to said presence service to which a plurality of presentities are associated;
 acquiring information about the status of said watcher (i.e. about active, terminated and, in some cases, pending states);
 receiving information regarding at least presence from at least part of said plurality of presentities;
 acquiring information about an idle, on-hold or suspended state of the presence subscription of said at least one watcher, and only if said at least one watcher is not in said idle, on-hold or suspended state:
 automatically delivering said information regarding at least presence from at least part of said plurality of presentities to said at least one watcher which is subscribed to said presence service to permit him to observe it.

For a preferred embodiment said subscription to said presence service includes at least a subscription to a list to which said plurality of list members are associated, and said information delivered to said at least one watcher are presence notifications.

In the method of the second aspect of the invention said watcher status are existing presence subscription states already defined in the SIP/SIMPLE protocol (A. B. Roach, RFC 3265: "Session Initiation Protocol (SIP)-Specific Event Notification", June 2002), and said idle, on-hold or suspended state is defined beyond said existing presence subscription states.

For an embodiment said step of acquiring said idle, on-hold or suspended subscriber state information is carried out by receiving a corresponding message from the watcher or from any other entity indicating that the subscription should be placed in the idle, on-hold or suspended status, by poll or push means, in a periodic or asynchronous way.

The method also comprises retaining said information about said presentities while said at least one watcher is in said idle, on-hold or suspended state, and to deliver said retained information to the at least one watcher upon changing from said idle, on-hold or suspended state to an active state.

For an embodiment said subscriber is using a user terminal provided with a presence service client to communicate with said presence service, and, for different embodiments, said idle, on-hold or suspended subscription state refers to a state where watcher's user equipment or terminal is in one or more of the situations already listed when describing the system proposed by the first aspect of the invention.

For an embodiment, in the method proposed by the invention said presence service is carried out by a Resource List Server, RLS, or by a presence server with the capabilities of a RLS, and wherein said subscription received from said at least one subscriber is in the form of only one SIP SUBSCRIBE message sent from said subscriber to said RLS.

Although the method of the second aspect of the invention has been describe for one watcher, it comprises carrying out said steps of receiving a subscription, of subscriber states information acquiring and of presentities information delivering, for a plurality of watchers in an identical or analogous manner, delivering said presentities information only to the watchers of said plurality of watchers who are not in said idle, on-hold or suspended state.

The method proposed by the second aspect of the invention is preferably carried out by using the system of the first aspect of the invention, thus the embodiments described for both, the method and the system, are mutually valid for each other.

BRIEF DESCRIPTION OF THE DRAWINGS

The previous and other advantages and features will best be understood by reference to the following detailed description of an illustrative and not limitative embodiment when read in conjunction with the accompanying drawing, wherein:

The FIGURE is a schematic view of the presence system proposed by the first aspect of the invention, according to an embodiment.

DETAILED DESCRIPTION OF AN EMBODIMENT

In the FIGURE it can be seen an embodiment of the presence system proposed by the first aspect of the invention for applying the method of the second aspect of the invention, where the presence system comprises:
 a presence service, or server, PS;
 three presentities E1, E2, E3 communicated with said presence server PS, in order to provide the presence server PS with presence notifications N1, N2, N3;
 a subscriber or watcher W bidirectionally communicated (when necessary) with said server PS, and able to observe said presence notifications N1, N2, N3, when delivered by the presence server PS.

In the FIGURE two alternative paths O1, O2 for the presence notifications N1-N3 are shown, the first one O1 representing the conventional direct delivery of presence notifications N1-N3 to the watcher W when he is in an active state, and the second one O2 representing an alternative path proposed by the present invention.

Said second path O2 is taken when the presence server PS determines that the watcher W is in the already explained idle, on-hold or suspended state, in which case the presence notifications N1-N3 are temporarily retained or stored, in block S, to finally be delivered to the watcher W upon his state returns to an active state, delivery which is indicated in FIGURE by the arrow departing from storage block S.

A person skilled in the art could introduce changes and modifications in the described embodiments, without departing from the scope of the invention as described in the enclosed claims.

The invention claimed is:

1. A method for providing a presence service comprising:
   receiving a subscription, from at least one subscriber, or watcher, to said presence service to which a plurality of presentities are associated;
   acquiring information about the status of said watcher;
   receiving information regarding at least presence from at least part of said plurality of presentities;
   acquiring information about an idle, on-hold or suspended state of the presence subscription of said at least one watcher, and only if said at least one watcher is not in said idle, on-hold or suspended state automatically delivering said information regarding at least presence from at least part of said plurality of presentities to said at least one watcher which is subscribed to said presence service to permit him to observe it,
   wherein said step of acquiring said idle, on-hold or suspended subscriber state information is carried out by receiving a corresponding message from the watcher or from any other entity indicating that the subscription should be placed in the idle, on-hold or suspended status, by poll or push means, in a periodic or asynchronous way.

2. The method according to claim 1, further comprising retaining said information about said presentities while said at least one watcher is in said idle, on-hold or suspended state, and to deliver said retained information to the at least one watcher upon changing from said idle, on-hold or suspended state to an active state.

3. The method according to claim 1, wherein said watcher is using a user terminal provided with a presence service client to communicate with said presence service, and wherein said idle, on-hold or suspended subscription state refers to a state where a screensaver is running in foreground of a display of the watcher's user equipment or terminal.

4. A method according to claim 1, wherein said watcher is using a user terminal provided with a presence service client to communicate with said presence service, and wherein said idle, on-hold or suspended subscription state refers to a state where watcher's user equipment or terminal is in a keylock state.

5. The method according to claim 1, wherein said watcher is using a user terminal provided with a presence service client to communicate with said presence service, and wherein said idle, on-hold or suspended subscription state refers to a state where watcher's user equipment or terminal is attending a telephone call.

6. The method according to claim 1, wherein said watcher is using a user terminal provided with a presence service client to communicate with said presence service, and wherein said idle, on-hold or suspended subscription state refers to a state where said presence service client is in a low activity period.

7. The method according to claim 1, wherein said watcher is using a user terminal provided with a presence service client to communicate with said presence service, and wherein said idle, on-hold or suspended subscription state refers to a state where watcher's user equipment or terminal is in a known idle, on-hold, battery saving mode or similar state.

8. The method according to claim 1, wherein said watcher is using a user terminal provided with a presence service client to communicate with said presence service, and wherein said idle, on-hold or suspended subscription state refers to a state where user is known not to be actively watching at the device screen or display equipment.

9. The method according to claim 1, wherein said watcher is using a user terminal provided with a presence service client to communicate with said presence service, and wherein said idle, on-hold or suspended subscription state refers to a state where watcher's user equipment or terminal is in a state where reception of timely presence information about one or more presentities is not relevant for the end user at that moment.

10. The method according to claim 1, wherein said step of acquiring said idle, on-hold or suspended subscriber state information is carried out by said presence service according to known information about said watcher.

11. The method according to claim 1, comprising acquiring said idle, on-hold or suspended subscriber state from a specific content body created according to the SIP PUBLISH method.

12. A method for providing a presence service comprising:
    receiving a subscription, from at least one subscriber, or watcher, to said presence service to which a plurality of presentities are associated;
    acquiring information about the status of said watcher;
    receiving information regarding at least presence from at least part of said plurality of presentities;
    acquiring information about an idle, on-hold or suspended state of the presence subscription of said at least one watcher, and only if said at least one watcher is not in said idle, on-hold or suspended state automatically delivering said information regarding at least presence from at least part of said plurality of presentities to said at least one watcher which is subscribed to said presence service to permit him to observe it; and
    retaining said information about said presentities while said at least one watcher is in said idle, on-hold or suspended state, and delivering said retained information to the at least one watcher upon changing from said idle, on-hold or suspended state to an active state,
    wherein said watcher status are existing presence subscription states already defined in the SIP/SIMPLE protocol, and wherein said idle, on-hold or suspended state is defined beyond existing presence subscription states already defined in the SIP/SIMPLE protocol.

13. A method for providing a presence service comprising:
    receiving a subscription, from at least one subscriber, or watcher, to said presence service to which a plurality of presentities are associated;
    acquiring information about the status of said watcher;
    receiving information regarding at least presence from at least part of said plurality of presentities;
    acquiring information about an idle, on-hold or suspended state of the presence subscription of said at least one watcher, and only if said at least one watcher is not in said idle, on-hold or suspended state automatically delivering said information regarding at least presence from at least part of said plurality of presentities to said at least one watcher which is subscribed to said presence service to permit him to observe it,
    wherein said watcher is using a user terminal provided with a presence service client to communicate with said presence service, and wherein said idle, on-hold or suspended subscription state refers to a state where watcher's user equipment or terminal, which is a clamshell cellular or wireless terminal, is closed but not switched off.

14. A method for providing a presence service comprising:
receiving a subscription, from at least one subscriber, or watcher, to said presence service to which a plurality of presentities are associated;
acquiring information about the status of said watcher;
receiving information regarding at least presence from at least part of said plurality of presentities;
acquiring information about an idle, on-hold or suspended state of the presence subscription of said at least one watcher, and only if said at least one watcher is not in said idle, on-hold or suspended state automatically delivering said information regarding at least presence from at least part of said plurality of presentities to said at least one watcher which is subscribed to said presence service to permit him to observe it,
wherein said watcher is using a user terminal provided with a presence service client to communicate with said presence service, and wherein said idle, on-hold or suspended subscription state refers to a state where said presence service client is not currently displayed to the user, whether because is not running on the user terminal or running in background, or for any other reason.

* * * * *